United States Patent [19]

Swanson

[11] Patent Number: 4,821,634
[45] Date of Patent: Apr. 18, 1989

[54] IN-LINE DOUGH LAMINATOR

[75] Inventor: Peter E. Swanson, Cloquet, Minn.

[73] Assignee: The Pillsbury Company, Minneapolis, Minn.

[21] Appl. No.: 168,827

[22] Filed: Mar. 16, 1988

[51] Int. Cl.⁴ .............................................. A21C 9/04
[52] U.S. Cl. .................................. 99/450.2; 99/450.1
[58] Field of Search ........................ 99/450.1–450.6, 99/485, 353–355; 366/69, 70; 425/310, 320, 321; 426/502; 198/603, 594, 812, 424, 431; 226/158

[56] References Cited

U.S. PATENT DOCUMENTS

| | | | |
|---|---|---|---|
| 4,622,890 | 11/1986 | Swanson | 99/450.2 |
| 4,656,908 | 4/1987 | Elwood | 99/450.2 |
| 4,678,418 | 7/1987 | Thulin | 425/310 X |
| 4,741,263 | 5/1988 | Ueno et al. | 99/450.1 |

Primary Examiner—Timothy F. Simone
Attorney, Agent, or Firm—Robert J. Lewis

[57] ABSTRACT

An apparatus that laminates dough with in-line conveyers. The laminator includes drive means which are adjustable to control the number of laminations in odd number multiples. The drive means are operably connected to multiple conveyers which provide uniform layering of the dough during lamination. The conveyers have their directions of belt movement in-line.

3 Claims, 5 Drawing Sheets

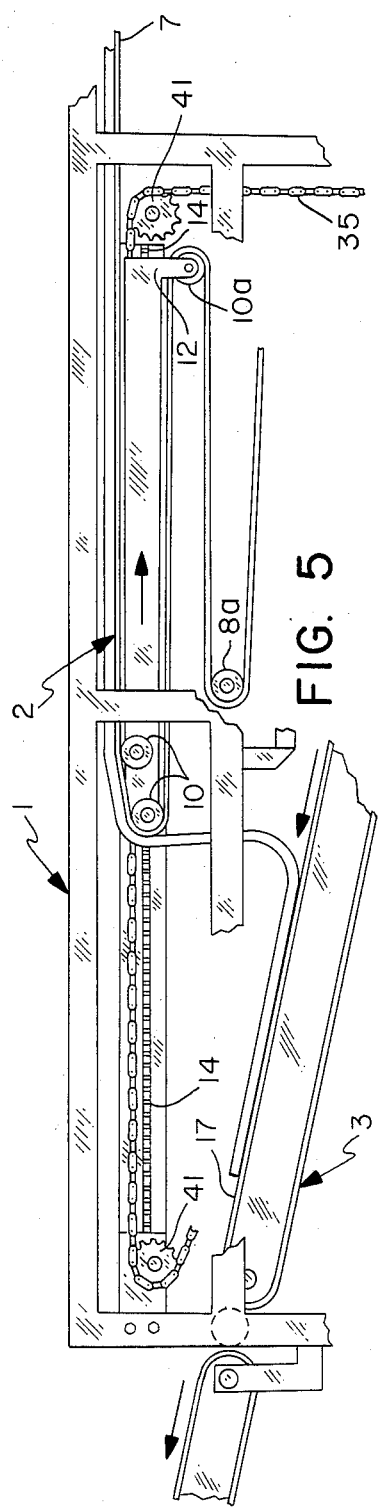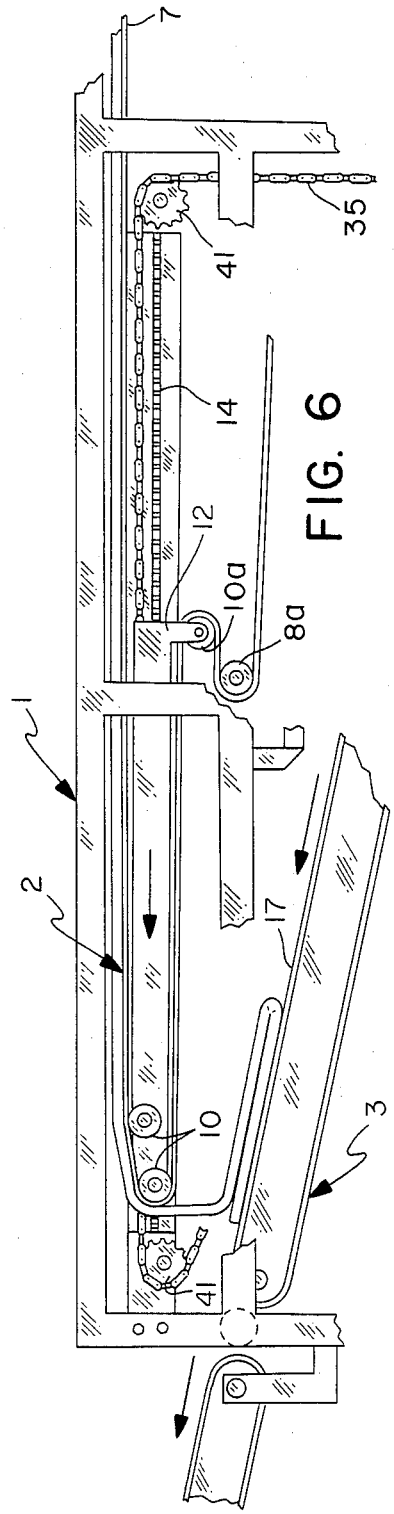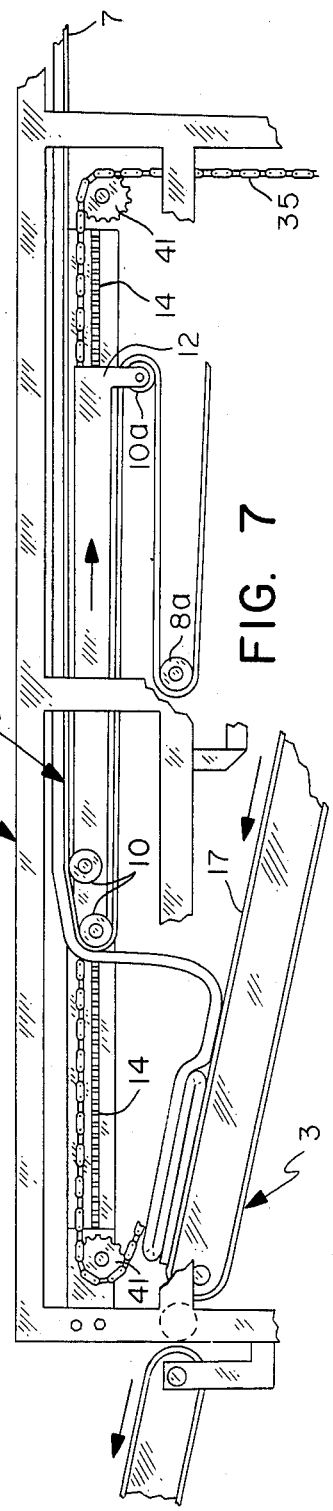

4,821,634

IN-LINE DOUGH LAMINATOR

FIELD OF THE INVENTION

The present invention relates to apparatus for laminating dough.

BACKGROUND OF THE INVENTION

In the manufacture of certain dough products, for example pastries, it is desirable to provide laminated dough. Laminated dough is dough with alternating distinct layers of fat and dough. Lamination provides a distinct texture in the resulting cooked dough product. Examples of laminated products are danish, croissants, etc.

Typical art laminators have two conveyers at right angles to one another. The top conveyer generally reciprocates back and forth depositing layers of dough onto a lower conveyer. The dough deposited on the lower conveyer is then conveyed through rollers or other processing equipment to provide a uniform thickness of dough. The dough fed to the reciprocating conveyer has two layers of dough with a layer of fat or shortening therebetween. Thus, when the dough is deposited on the take away conveyer, it is in the form of a plurality of alternating layers of fat or shortening and dough. A form of this type of laminator is disclosed in U.S. Pat. No. 4,622,890, dated Nov. 18, 1986, to Peter Swanson.

Such laminators are effective but can require a significant amount of floor space. This can be objectionable in some environments, for example small bakeries which may not have adequate floor space to accommodate large machinery. Another problem with this type of laminator is that it precludes the use of an in-line dough processing system. It also laminates dough in even numbers of layers.

It has long been a desire to provide an in-line dough laminator which would provide uniform laminating without complicated machinery. The present invention provides an effective and simple in-line dough laminator. The drive means provides easy variability of the laminating process to provide the desired amount of lamination.

It is an object of the present invention to provide a dough laminator which has in-line dough conveyers.

It is another object of the present invention to provide an in-line dough laminator which can be adjusted to provide different numbers of layers in the deposited dough product.

It is another object of the present invention to provide an in-line dough laminator which has drive means which are easily changed for adjustment of the dough lamination process.

It is a still further object of the present invention to provide an in-line dough laminator which is simple in construction and positive in operation.

It is a still further object of the present invention to provide an in-line dough laminator which provides uniformly laminated dough.

FIGS. 5, 6 and 7 are fragmentary side elevational views of the conveyors showing the feed conveyor in various forward and retracted positions.

DETAILED DESCRIPTION

Figure 1:
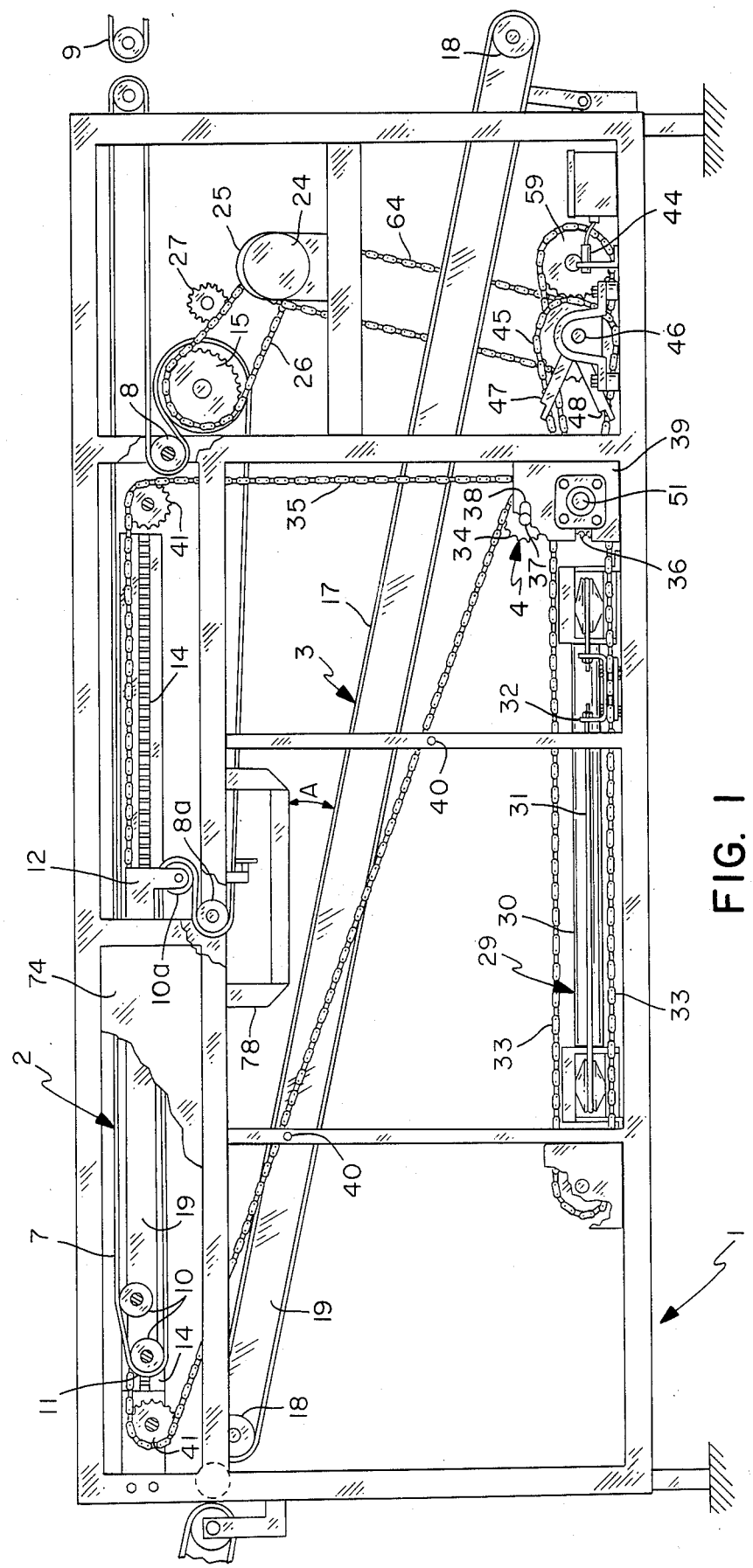
FIG. 1 is a side elevational view of portions of the dough laminator and drive means.

The reference numeral 1 designates generally a frame means which has suitably mounted thereon infeed conveyor means 2 and outfeed conveyor means 3. Drive means 4 as best seen in FIG. 1 is operably connected to the infeed conveyor means 2 for driving same as hereinafter described. Suitable drive means (not shown) is operably connected to the outfeed conveyor 3 for driving same independently of the infeed conveyor means as hereinafter described.

As shown, the infeed conveyer means 2 includes a belt 7 moveably mounted on the frame 1, for example via rotatably mounted rollers 8. The rollers 8 are suitably mounted on the frame 1. A feed conveyor means 9 of any suitable kind can be positioned adjacent the infeed conveyor means 2 to provide a dough sheet thereto or the dough can be extruded thereon in any suitable manner as is known in the art. A plurality of rollers 10 are rotatably and longitudinally moveably mounted on the frame 1 to provide for reciprocating movement of the feed end 11 of the belt 7. It is to be understood that the description of one side of the conveyer means is applicable to the other side since the machine is preferably symmetrical on both sides. As shown, the rollers 10 are mounted on elongate brackets 12 which are suitably slidably mounted on sides of the frame 1 via rollers (not shown) mounted in tracks 14. The tracks 14 are suitably secured to the frame 1. This allows for reciprocating motion of the end 11 of the conveyer means 2. A drive roller 15 is suitably rotatably mounted on the frame 1 and drives the belt 7.

The outfeed conveyer means 3 includes a belt 17 which is suitably moveably carried by rollers 18 which are suitably rotatably mounted on the frame 1. It is to be understood that the upper runs of the belts 7 and 17 are supported by longitudinally extending plates 19 thereunder.

Suitable belts tensioning devices (not shown) can also be provided to maintain the proper tension in respective belts 7 and 17.

An important part of this invention is that the upper runs of the belts 7 and 17 be positioned at an angle relative to one another with the angle A being in the range of between about 10° and about 20°. The larger angle A is limited primarily by possible slippage of the dough on the belt 17. The angle also allows for proper lamination and practical movement speeds of the reciprocating motion of the feed end 11.

The outfeed conveyer 3 can feed the laminated dough to another conveyer (not shown) for movement to subsequent processing machinery as is known in the art.

The angular position of the upper runs of the belts 7 and 17 should be at least in the area of the full length of the reciprocating motion of the end 11. Also, angle A is the same for the plane of travel of the feed end 11 as it is for the plane of the top run of the belt 7.

As shown, the outfeed conveyer 3 drive means (not shown) is a motor and gear reducer. It is operably connected by suitable drive means to the belt 17. Any suitable drive means can be used and preferably is varible in speed, as for example by using a variable speed motor.

As shown, the rollers 10 are positioned and mounted so that during the reciprocating motion they prevent slack from forming in the belt 7. This is accomplished by having the roller 10A positioned above the roller 8A and the top and bottom runs of the belt 7. It can be seen that this arrangement compensates for belt length during reciprocating motion.

Figure 2:
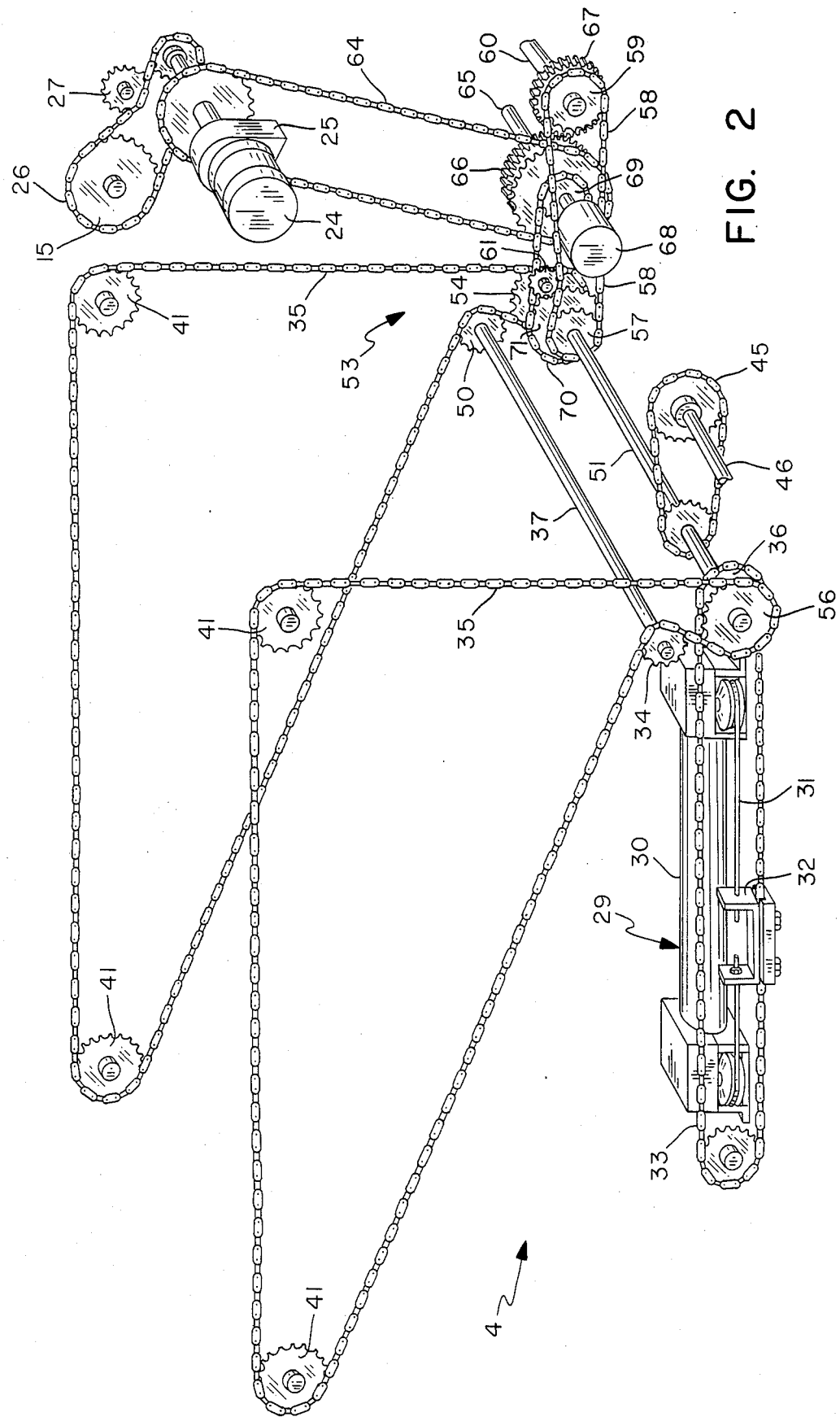
FIG. 2 is a schematic illustration of the drive means for the dough laminator.
Figure 3:
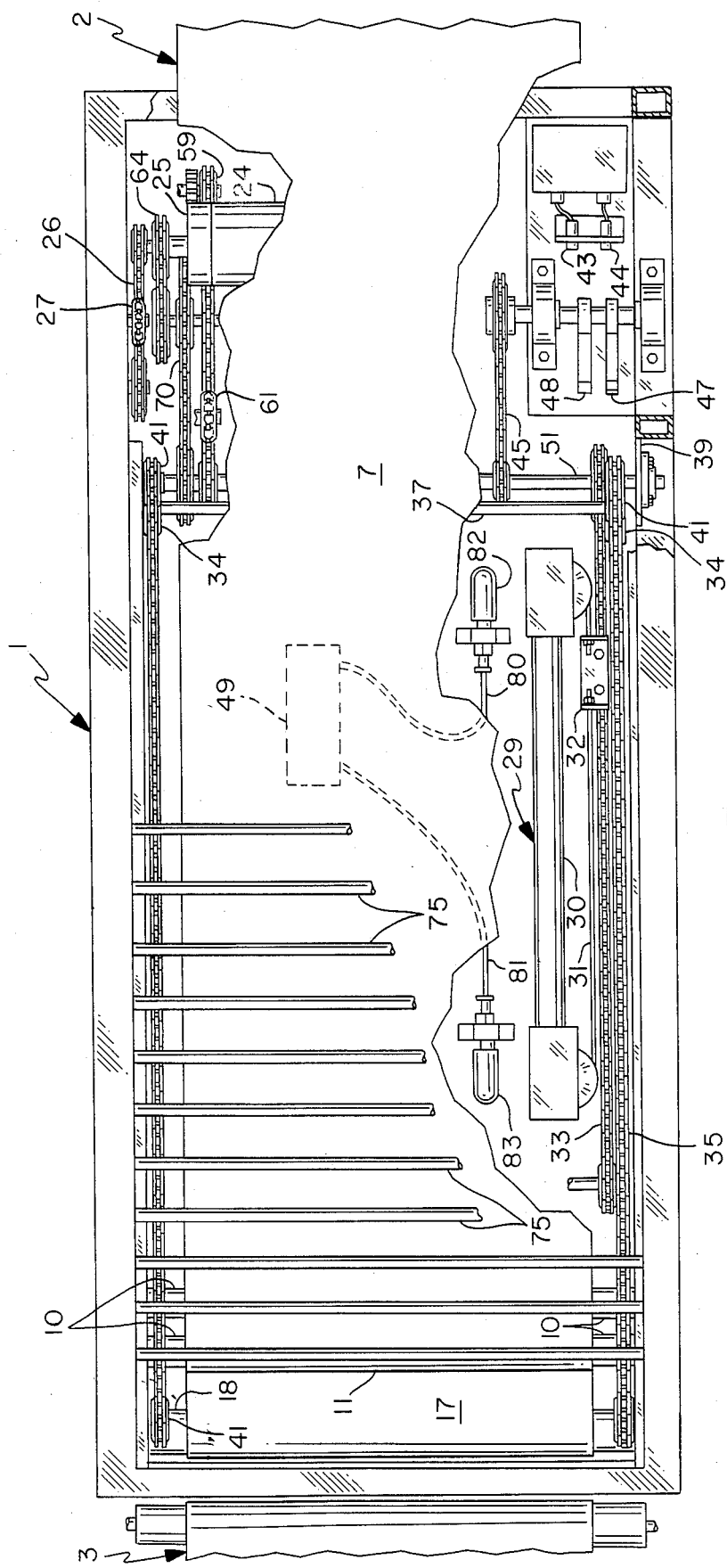
FIG. 3 is a plan view of the dough laminator.

The drive means 4 is best illustrated in FIG. 2. It preferably includes two drive elements. The first drive element is a variable speed electric motor 24 driving a gear reducer 25. These are suitably mounted on the frame 1. This drive means is connected to the drive roller 15 via a chain and sprocket arrangement 26. An idler sprocket 27 is provided for adjustment of chain tension.

The drive means 4 is operable for driving the belt 7 and its reciprocating movement of the feed end 11 in preselected synchronization and preferably provides a long stroke of about 2 feet of movement of the end 11 during operation. To this end the drive means 4 also includes a drive means 29 which is operably connected to the conveyer 7 for reciprocating the feed end 11. It is preferred that the drive means 29 and motor 24 be mechanically connected together to provide controlled positive synchronized operation.

The drive means 29 includes a double acting pneumatic cylinder 30 of the cable type. A flexible cable drive 31 is connected to the cylinder 30. The cylinder 30 is suitably mounted on the frame 1. A bracket 32 is connected to opposite ends of the cable 31 and is also connected to a flexible drive means, for example a chain 33. Chain 33 is operably connected to a drive element 35, for example a chain, which in turn is connected to the bracket 12. The connection is through a sprocket arrangement 36, which is suitably rotatably mounted on the frame 1 via a shaft 51. As shown, the shaft 51 connects both sides of the drive together so that the two chains 35 act in unison. A shaft 37 is mounted on the frame and is adjustable in position to compensate for slack in the chains 35. Idlers 34 are rotatably mounted on the shaft 37 and engage the chains 35 permitting movement and change in direction of the chains 35. Adjustment can be done, for example, by having elongated slots 38 in the mounting plate 39. Chain supports 40 of the friction type can also be suitably mounted on the frame 1 to help support the chains 35. The supports can also be moveably mounted on the frame to compensate for chain tension and position. Opposite ends of one chain 35 are each connected to the bracket 12 and are supported by upper idlers 41 suitably rotatably mounted on the frame 1. Thus, reciprocating motion of the chain 35 by virtue of reciprocating motion of the cylinder 30 effects reciprocating movement of the free end 11.

The length of stroke of the cylinder 30 is controlled by suitable adjustable control means. As shown, the control means includes proximity switches 43 and 44. A sprocket and chain arrangement 45 operably connects the cylinder 30 to the control means. Two arms 47 and 48 are mounted on an output shaft 46 and move in response to movement of the cylinder 30. During rotation of the shaft 46 the arms 47 and 48 pass their respective proximity switches 43 and 44 activating the solenoid activated air control valve 49 thereby controlling the direction of travel of the cylinder 30 as is known in the art. By adjusting the position of the arms 47 and/or 48 on the shaft 46 the length of stroke and the timing of the initiation of the strokes can be easily adjusted.

Figure 4:
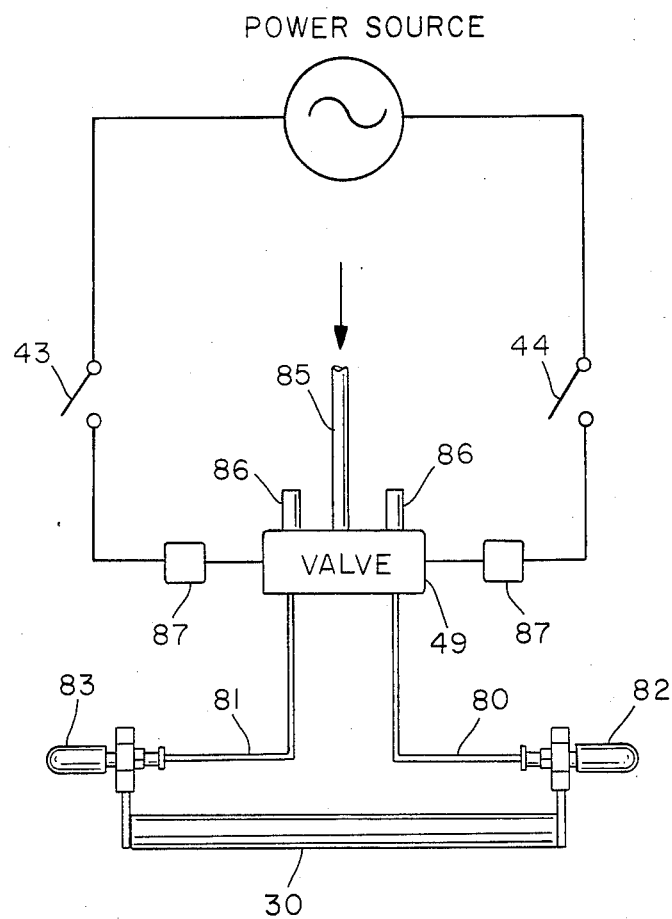
FIG. 4 is a schematic illustration of the pneumatic control system for the dough laminator.

As seen in FIG. 4 cylinder 30 is connected to the valve 49 by a conduit 80 and 81. It is preferred that quick exhaust valves 82 and 83 be connected in the respective conduits 80 and 81. The valves 82 and 83 allow quick venting of the cylinder 30 when the pressure in the conduits 80 and 81 is relieved by shifting of the valve 49. Pressurized air is fed to the valve 49 via a conduit 85. Exhaust ports 86 allow for venting of the valve and release of pressure from the lines 80 and 81. The solenoids 87 of the valve 49 are each connected to a suitable power source and are activated by respective switches 43 and 44.

The cylinder 30, through the drive means 4, is restricted in speed of movement by its connections to the motor 24. It is working against the motor in a positive mechanical manner, thereby limiting its speed of movement, both on forward and reverse strokes.

The sprocket arrangement 36 is mounted on the shaft 51 which extends to the opposite side of the frame 1 for connection with other portions of the drive means 4 and ultimately to the motor 24. On the end of the shaft 51 opposite the cylinder 29 there is provided a drive control means 53.

As shown, the drive means 53 operably connects the motor 24 to the cylinder 30 for control thereof. As shown the chain 35 adjacent the drive means 53 is engaged with a sprocket 50 which is rotatably mounted on the shaft 37. A second sprocket 54 engages a chain 35 and is mounted on the shaft 51. However, on the cylinder side, the chain 35 is engaged with a sprocket 56 mounted on the shaft 51. The shaft 51 also has rigidly mounted thereon a sprocket 57 which is driveably engaged with the chain 58 which is in turn engaged with a sprocket and overrunning clutch arrangement 59 mounted on the shaft 60. The sprocket 59 is part of an overrunning clutch. The shaft 60 is rotatably mounted on the frame 1. An idler 61 can also be provided for adjusting tension in the chain 58.

The drive means 53 also includes a sprocket and chain 64 connection to the motor 24. The sprocket and chain 64 are connected to a shaft 65. Sprocket and chain 64 are driveably connected to a gear 66 which is also mounted on the shaft 65. The gear 66 is meshed with a second gear 67 which is rigidly mounted on the shaft 60. Thus, the sprocket 59 and chain arrangement 58 are driveably engaged with the motor 24.

An overrunning sprocket and clutch arrangement 68 is mounted on the shaft 65. The clutch arrangement 68 includes a sprocket 69 which is engaged with a chain 70. The chain 70 is also engaged with a sprocket 71 which is rigidly mounted on the shaft 51. Thus, motor 24 is driveably engaged with the shaft 51.

In operation, the sprocket and clutch arrangement 59 is operable for controlling movement of the cylinder 29 during retracting movement of the end 11 of the conveyer means 2. The sprocket 69 and clutch 68 arrangement control movement of the cylinder 29 during extending movement of the end 11 of the conveyer means 2.

As best seen in FIG. 2 and viewed from the cylinder side of the apparatus the overrunning clutch arrangement 59 drives in the clockwise direction and freewheels in the counterclockwise direction and the overrunning clutch arrangement 68 drives in a counterclockwise direction and freewheels in the clockwise direction. The drive arrangement 53 through the gearing arrangement allows for the differential speed of movement in the forward and reverse directions of the free end 11.

The gearing ratios of the drive means 53 is such as to control the forward movement speed and the rearward movement speed at preselected rates. The rearward movement or retracting movement of the free end 11 is 3 times faster than the forward movement speed or extending movement speed of the end 11. Different speeds may be used for different angles A.

The relative speed of the belt 7 during retraction and extension to the speed of the belt 17 is such as to prevent tension or compression in the dough as it is fed from the end 11 for depositing on the conveyer 17.

The angular relation of the plane of movement of the end 11 to the upper run of the belt 17 allows reasonable movement speeds of the end 11.

By controlling the speed of the motor 24 the number of reciprocating motions per unit of time is controlled. The device as illustrated provides a laminator which will provide odd number of multiples of layers to be deposited, i.e. 3,5,7 etc. onto the conveyer 17. By contrast, a right angle laminator provides even number multiples of layers i.e. 2,4,6 etc. The speed of the out-feed conveyer 17 can also be adjusted to provide variability in the lamination produced.

As can be seen, side guards 74 can be provided to prevent accidental contact with moving portions of the apparatus. Also, guards 75 can be mounted over the conveyers to provide protection but also allow for viewing of the product. The guards can be safety interlocked as is known in the industry so that removal or movement of a guard from the closed position will inactivate the machine. Further, dedusters or belt cleaner 78 can also be provided to help maintain the belts 7 and 17 in clean condition.

It is to be understood that while preferred forms of the invention have been shown and described, it is not to be limited to those forms except to the extent that such limitations are found in the claims.

What is claimed is:

1. An in-line dough laminator for forming a dough web into a laminated dough web by lapping the dough web on itself, said laminator comprising:
    a. frame means;
    b. a first conveyer means having a feed end which is reciprocably mounted on said frame means, said conveyer means having a first movable belt with a longitudinal axis direction of belt movement;
    c. a second conveyer means having a second movable belt with a longitudinal axis of belt movement generally parallel to said first belt direction of movement, said second belt having an upper belt run positioned under said feed end for a distance at least the length of said reciprocating movement, said upper belt run of said second conveyer means being at an angle A in the range of between about 10° and about 20° of the plane of movement of said feed end of said first conveyer means;
    d. drive means operably connected to said first conveyer means and operable for reciprocating said feed end of said first conveyer means at a first extending speed and a second retracting speed; and
    e. means for maintaining tension in said first belt during reciprocating motion of said feed end.

2. An in-line dough conveyer as set forth in claim 1 wherein:
    a. said drive means includes a reciprocating motion device operably connected to said first conveyer means for effecting reciprocating motion of said feed end; and
    b. said drive means further includes a second drive portion which limits the first extending speed and the second retracting speed of said feed end.

3. An in-line dough conveyer as set forth in claim 2 wherein:
    a. said second drive portion of said drive means is operably connected to said first conveyer means for driving said first belt.

* * * * *